Patented Feb. 26, 1952

2,587,566

UNITED STATES PATENT OFFICE 2,587,566

NITROBENZYL ETHERS

Saul R. Buc and David I. Randall, Easton, Pa., assignors to General Aniline & Film Corporation, New York, N. Y., a corporation of Delaware No Drawing. Application November 22, 1949, Serial No. 128,918

7 Claims. (Cl. 260—611)

This invention relates to nitrobenzyl ethers of alcohols and alcohol ethers of polyhydric alcohols and to methods for preparing these compounds.

More particularly, the invention is directed to compounds having the following general formula:

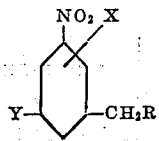

wherein R is the ether residue formed from compounds selected from the group consisting of alcohol and alcohol ethers of polyhydric alcohols, X is selected from the group consisting of hydrogen and methyl, and Y is selected from the group consisting of hydrogen, chlorine and the methyl ethers of alcohols and alcohol ethers of polyhydric alcohols.

In copending applications Serial Nos. 128,916, filed November 22, 1949, and 128,917, filed November 22, 1949, we have described the chloromethylation of certain aromatic nitro compounds and the dichloromethylation of nitrotoluene, respectively. Beginning with these compounds, we have found that chlorine may be replaced by other functional groups by reacting the nitro compound with an alcohol or an alcohol ether of a polyhydric alcohol.

The following examples will serve to illustrate preferred embodiments of the invention but it will be understood that the invention is not limited thereto.

Example I 765 parts by weight of ethylene glycol are mixed with 103 parts by weight of nitrobenzyl chloride. The mixture was rapidly distilled and the distillate tested from time to time for the presence of hydrogen chloride acid as follows:

| Elapsed Time (Min.) | B. P. | Vol. of Distillate (ml.) | HCl in Dist. |
| --- | --- | --- | --- |
| 0 | 164 | 0 | +(1st drop). |
| 5 | 175 | 50 | + |
| 11 | 185 | 98 | + |
| 15 | 192 | 128 | + |
| 20 | 197 | 168 | + |
| 25 | 199 | 220 | Weak+ |
| 30 | 200 | 275 | Neg. |

The remaining mixture was distilled under a water pump vacuum (about 12 mm.) and the residue distilled under a vacuum oil pump. Practically all of the liquid distilled as a golden yellow oil at 150° C. and 0.3 mm. pressure, leaving only a negligible residue. The yield was found to be 190 parts or 92.5% for $C_9H_{11}NO_4$. The weight of the elements are theoretically C=54.82, H=5.62, N=7.10 and an analysis showed C=54.89, H=5.53 and N=7.03.

The reaction may be represented as follows:

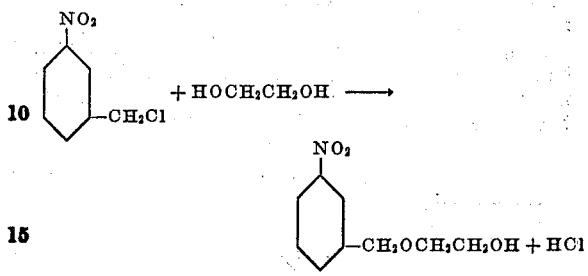

Example II

The process of Example I was repeated using 514.5 parts by weight of nitrobenzyl chloride and 3660 parts by weight of ethylene glycol. Because this was a larger charge than in Example I, two hours were required to distill to neutrality. Despite the longer exposure to elevated temperatures the yield was still 85%.

In a similar manner, the following compounds were prepared:

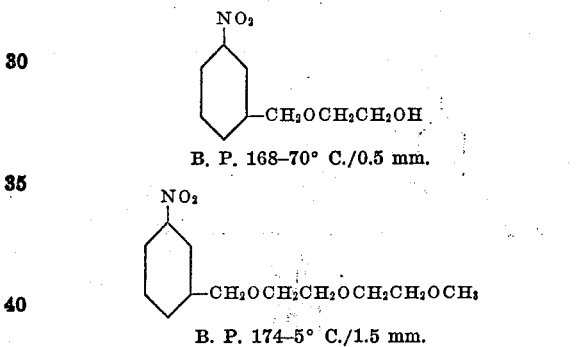

B. P. 168–70° C./0.5 mm.

B. P. 174–5° C./1.5 mm.

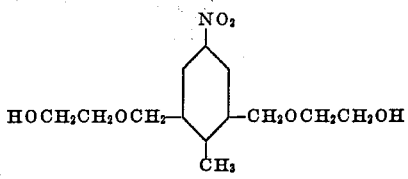

Not distillable

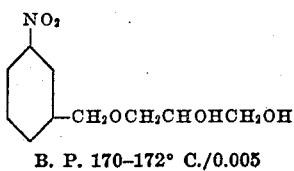

B. P. 170–172° C./0.005

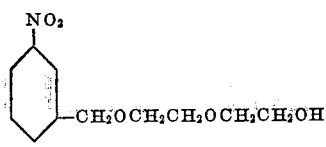

B. P. 152–4° C./0.01

For the formation of the ethers, both monohydric and polyhydric alcohols may be used as well as alcohol ethers of polyhydric alcohols. As examples of monohydric alcohols may be mentioned methyl, ethyl, propyl and butyl. As examples of polyhydric alcohols may be mentioned ethylene glycol, trimethylene glycol and other methylene glycols, glycerol, and the higher polyhydric alcohols such as erytrithol, mannitol, sorbitol, etc. and the alcohol or partial ethers thereof such as the monomethyl, monoethyl and monobutyl ethers of ethylene glycol and the monoethyl ethers of diethylene glycol, etc. Further examples of the nitro compounds will be obvious to those skilled in the art but all of the examples of the above-mentioned copending applications are included as examples herein.

In general, the temperature of reaction should be above 140° C. and for alcohols with lower boiling points higher pressures may be used. Furthermore, it is desirable to use excessive amounts of the alcohol to prevent the joining of two molecules of the nitro compound.

We claim:

1. The compounds having the general formula:

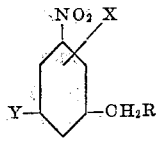

wherein R is the ether residue formed from compounds selected from the group consisting of alcohol and alcohol ethers of polyhydric alcohols, X is selected from the group consisting of hydrogen and methyl, and Y is selected from the group consisting of hydrogen, chlorine and the methyl ethers of alcohols and alcohol ethers of polyhydric alcohols.

2. A compound having the formula:

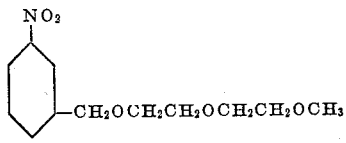

3. A compound having the formula:

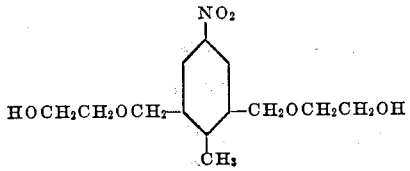

4. A method for preparing compounds having the following formula:

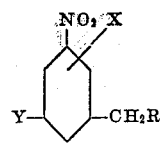

wherein R is the ether residue formed from compounds selected from the group consisting of alcohol and alcohol ethers of polyhydric alcohols, X is selected from the group consisting of hydrogen and methyl, and Y is selected from the group consisting of hydrogen, chlorine and the methyl ethers of alcohols and alcohol ethers of polyhydric alcohols, which comprises reacting the corresponding chloromethyl compound with the corresponding alcohol or alcohol ether and separating the compound by distillation.

5. The compound having the formula,

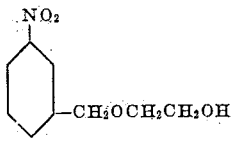

6. A compound having the formula,

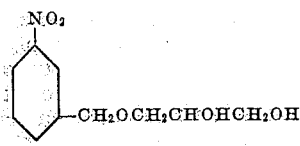

7. A compound having the formula,

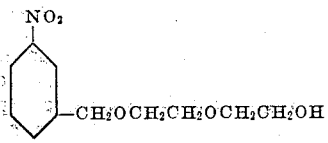

SAUL R. BUC.
DAVID I. RANDALL.

REFERENCES CITED

The following references are of record in the file of this patent:

UNITED STATES PATENTS

| Number | Name | Date |
| --- | --- | --- |
| 2,450,277 | Doelling et al. | Sept. 28, 1948 |
| 2,485,712 | Doelling et al. | Oct. 25, 1949 |

FOREIGN PATENTS

| Number | Country | Date |
| --- | --- | --- |
| 379,881 | Germany | Aug. 28, 1923 |
| 655,871 | France | Apr. 24, 1929 |